(12) United States Patent
Bleier

(10) Patent No.: US 6,873,265 B2
(45) Date of Patent: Mar. 29, 2005

(54) SATELLITE AND GROUND SYSTEM FOR DETECTION AND FORECASTING OF EARTHQUAKES

(75) Inventor: Thomas E. Bleier, Portola Valley, CA (US)

(73) Assignee: QuakeFinder LLC, Palo Alto, CA (US)

( * ) Notice: Subject to any disclaimer, the term of this patent is extended or adjusted under 35 U.S.C. 154(b) by 657 days.

(21) Appl. No.: 10/017,520

(22) Filed: Dec. 14, 2001

(65) Prior Publication Data

US 2003/0052777 A1 Mar. 20, 2003

Related U.S. Application Data

(60) Provisional application No. 60/322,287, filed on Sep. 14, 2001.

(51) Int. Cl.[7] ................................................ G08B 21/00
(52) U.S. Cl. ............ 340/690; 340/539.26; 340/539.28; 702/15; 382/109; 342/76
(58) Field of Search ....................... 340/539.26, 539.28, 340/686.1, 689, 690; 702/15, 2, 14–18; 342/26, 357.16, 460; 308/109; 324/323

(56) References Cited

U.S. PATENT DOCUMENTS

| 4,126,203 A | * | 11/1978 | Miller | 181/109 |
|---|---|---|---|---|
| 4,170,776 A | | 10/1979 | MacDoran | 343/112 |
| 4,489,383 A | | 12/1984 | Schmidt, Jr. | 364/434 |
| 4,656,867 A | | 4/1987 | Sasaki | 73/170 |
| 4,797,677 A | * | 1/1989 | MacDoran et al. | 342/352 |
| 5,296,866 A | | 3/1994 | Sutton | 343/701 |
| 5,367,306 A | * | 11/1994 | Hollon et al. | 342/386 |
| 5,474,264 A | | 12/1995 | Lund et al. | 244/171 |
| 5,628,050 A | * | 5/1997 | McGraw et al. | 455/12.1 |
| 5,811,974 A | * | 9/1998 | Hata | 324/344 |
| 5,910,905 A | * | 6/1999 | Qian et al. | 708/311 |
| 5,918,155 A | * | 6/1999 | Nakamura et al. | 455/12.1 |
| 6,018,244 A | | 1/2000 | Kushida | 324/323 |
| 6,462,665 B1 | * | 10/2002 | Tarlton et al. | 340/601 |
| 6,476,608 B1 | * | 11/2002 | Dong | 324/323 |

OTHER PUBLICATIONS

International Search Report.

* cited by examiner

*Primary Examiner*—Benjamin C. Lee
*Assistant Examiner*—Son Tang
(74) *Attorney, Agent, or Firm*—Howrey Simon Arnold & White LLP

(57) ABSTRACT

The present invention describes the use of a space-based Extremely Low Frequency (ELF) magnetic field detector in conjunction with ground-based network of ELF magnetic field detectors. In particular, a space based ELF detection system can be used to perform a wide area search and find precursor earthquake signals in both known and unknown earthquake zones, and a ground-based network of ELF detectors can be used to verify that the signals are indeed earthquake generated signals. The use of this invention will minimize cost and manpower necessary to effectuate an accurate and reliable earthquake detection system.

27 Claims, 16 Drawing Sheets

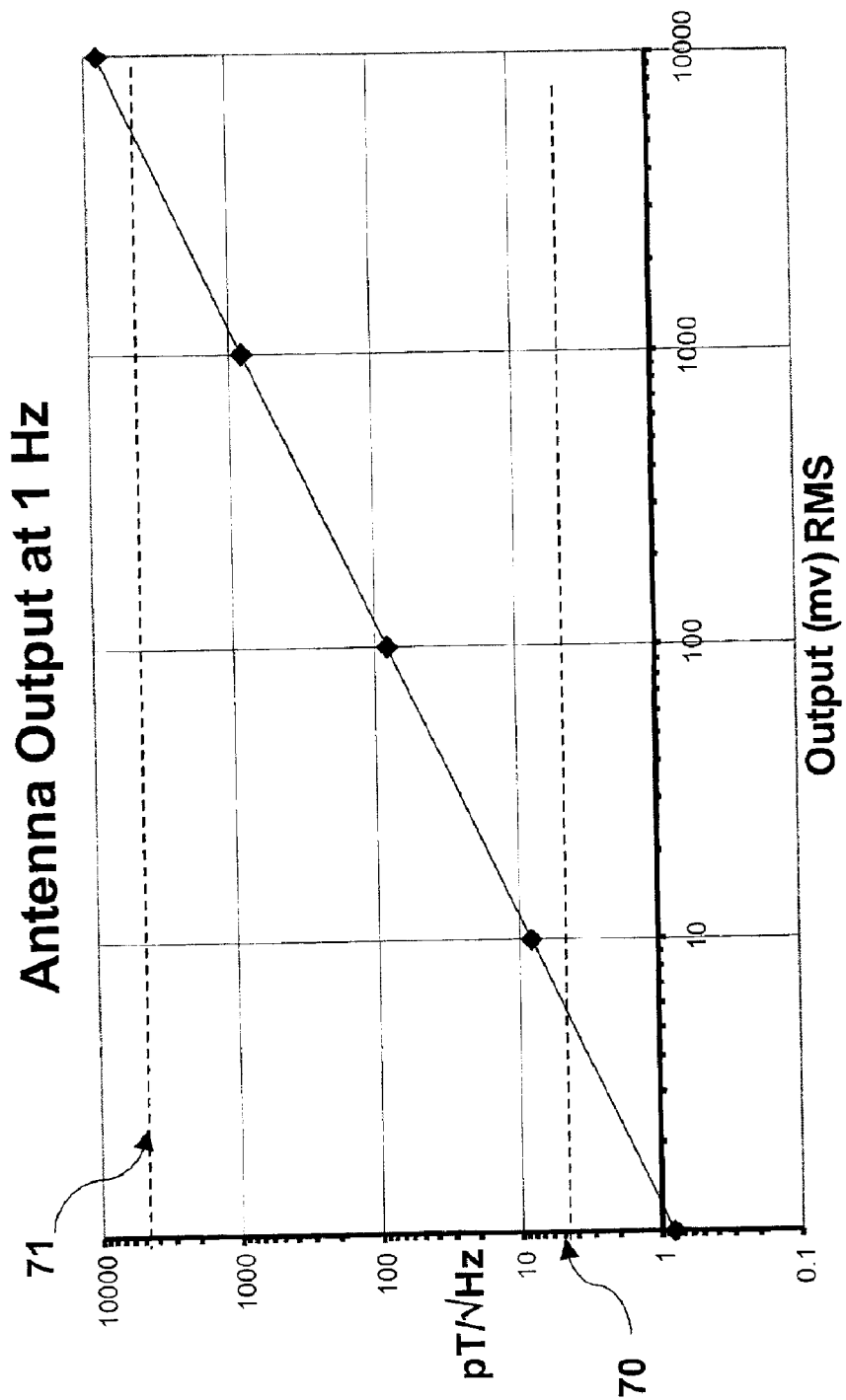
FIG. 8 Calibration Curve

FIG. 10 Satellite Instrument Block Diagram

US 6,873,265 B2

SATELLITE AND GROUND SYSTEM FOR DETECTION AND FORECASTING OF EARTHQUAKES

This application claims the benefit of Provisional Application No. 60/322,287, filed Sep. 14, 2001.

TECHNICAL FIELD

The present invention relates generally to earthquake monitoring and forecasting. More particularly, the invention relates to a satellite and ground-based system and method of using a satellite and ground based system to accurately and reliably forecast areas likely to be affected by an earthquake in the near future.

BACKGROUND ART

Earthquake forecasting has the potential to save thousands of lives and billions of dollars in property damage. Accurate earthquake forecasting can give inhabitants of a pending earthquake area time to prepare and minimize the loss of life and property damage.

Unfortunately, the reliable forecasting of earthquakes has so far eluded scientists, as no one has yet developed an accurate system or method for determining when an earthquake will occur and how devastating it will be. Currently, one method of forecasting earthquakes uses statistics of recent earthquakes in a known earthquake region. The more recent an earthquake has occurred, the less likely another one will occur. Unfortunately, this method is a very inaccurate forecaster of earthquakes, because one cannot specify where or when an earthquake will happen. One can only determine that it is statistically more or less likely to happen in a region as time goes on. Further, this method is applicable only in zones where earthquakes have been observed before, because the method requires the use of past earthquakes in order to calculate future probabilities. To accurately and reliably forecast earthquakes, methods of forecasting are being considered that detect signals from impending earthquakes, rather than using data from those that have past.

One such method is searching for extremely low frequency (ELF) magnetic field fluctuations emitted from a zone where an earthquake is imminent. This method gained acceptance after the Oct. 17, 1989 Loma Prieta earthquake near San Francisco. A significant increase in the earth's ELF magnetic signal was measured by a ground based detector over a month before the Loma Prieta earthquake. Then, during the two weeks before the earthquake, there was an increase in background ELF magnetic signal, leading up to a large surge of ELF magnetic signal that occurred approximately three hours before the quake.

Further evidence that ELF magnetic activity is an accurate forecaster of earthquakes was obtained in both 1982 and 1989 by two different satellites that detected increased ELF magnetic signal before and after an earthquake occurred on earth. Two different satellites, a Russian satellite (Cosmos 1809) and a French satellite (Aureol 3), have detected ELF signatures at 140 –150 Hz while flying over earthquakes. Cosmos 1809 detected ELF signatures days to weeks after a M6+ earthquake and during the aftershock sequence at Spitak Armenia in 1989, while Aureol 3 detected ELF just prior to a M4.9 in April of 1982 in Saggadiera Japan. The position where the satellites observed the increased ELF magnetic signal correlated with the location of the actual earthquake. Unfortunately, these satellites were not specifically searching for ELF magnetic activity from earthquakes, and thus, a detailed analysis could not be done. These occurrences do, however, show promise for a space-based detector of ELF magnetic activity for earthquake forecasting.

Ground detectors used today are able to sense increased ELF magnetic signal when they are within approximately 20 miles of the epicenter of a pending earthquake. Using data from multiple detectors on the surface of the earth, one can try to determine the location of the largest increase in ELF magnetic signal in an earthquake area, which should correspond to the location of the earthquake. One can also try to use such data to determine the magnitude of an earthquake. It is hypothesized that the greater the ELF magnetic activity, the larger the earthquake will be. This hypothesis is consistent with a current theory as to why ELF magnetic measurements increase before an earthquake. The theory is that rocks begin to crack within the slip plane and thus tear electrons off of the lattices in the crystalline rock and create plasma. The plasma naturally emits electromagnetic waves, but it is only the ELF magnetic activity that is able to travel through the earth to the surface for detection. The severity of the earthquake and the increase in ELF magnetic signal depend on how much rock is cracked.

Both ground and space systems for detecting ELF magnetic precursors of earthquakes have significant drawbacks. First, ground systems can be extremely costly. Ground detectors are only able to measure the ELF activity within a certain distance from where they are placed. Because of the large area in which earthquakes can occur, numerous ground detectors are necessary to adequately cover an earthquake zone. In addition to the cost of the numerous detectors, one must factor in the cost for monitoring equipment and analysis and maintenance of the system. Due to the expense of ground systems, it is simply not practical to monitor or forecast earthquakes in areas with little historical risk from earthquakes, i.e., for a significant portion of the earth's landmass. However, devastating earthquakes may take place in areas that have not had earthquake activity for a long time or in areas that have not had a recorded earthquake. Thus, a better system is necessary in order to forecast or monitor earthquake activity in regions with little or no known earthquake activity.

Second, ground systems are often not practical for populated areas. The sensitive ground detectors are susceptible to problems with ELF magnetic noise. Various powered devices may create false positives for an ELF magnetic signal detector, making careful placement of the ground detectors to minimize outside influences essential. In highly populated areas, detectors may be intrusive, and it may not be possible to place detectors where they will not be susceptible to noise problems.

In order to maximize the area of detection and minimize noise, scientists have considered using satellites to detect ELF magnetic fluctuations from earthquakes. Satellites have the obvious advantage of being able to take measurements over a larger geographical region. However, the use of satellites has problems as well. First, satellite technology is extremely expensive to implement and maintain. An effective satellite monitoring system first requires the use of a satellite or group of satellites that have orbit(s) covering the areas of interest. Some scientists have attempted to use Global Positioning System (GPS) to monitor small geologic plate movements related to earthquakes. There is not, however, presently a satellite or system of satellites capable of detecting ELF magnetic fluctuations, which as discussed above, is a promising indicator of earthquakes. It is of great interest to society to implement such a system of satellites for monitoring ELF magnetic activity. Therefore, any savings in both the cost of production and the maintenance of the satellites is extremely valuable.

One issue that arises with the use of a satellite system is that each satellite is capable of detecting an ELF signal emanating from a single location on earth only once every 4 days. Therefore, satellites track ELF fluctuations periodically rather than continuously. It may take a few days for a satellite to verify that the ELF fluctuation measured is an earthquake precursor rather than an anomaly. This lag time in verification decreases the amount of time to prepare for the earthquake.

The present invention addresses the aforementioned problems with respect to cost, efficiency, and timeliness of earthquake forecasting.

SUMMARY OF THE INVENTION

One aspect of the present invention is the use of a space based ELF magnetic detector in conjunction with a ground based ELF magnetic detector. For example, a space based detection system can be used to perform a wide area search and find precursor earthquake signals in both known and unknown earthquake zones, and a ground based detection system can be used to verify that the signals are indeed earthquake generated signals. The use of this invention will minimize cost and manpower necessary to effectuate an accurate and reliable earthquake detection system.

One embodiment of the invention is a system for earthquake forecasting comprising one or more satellite detectors in orbit and one or more portable ground detectors. The preferred embodiment of the invention, as described further below, uses one or more satellite detectors and one or more ground detectors that measure ELF magnetic activity. One could also perform correlations with other types of detectors (e.g. radon gas detectors, interferometric synthetic aperture radar (IFSAR), GPS, etc.). The preferred embodiment uses satellite detectors with three-axis antennas. The satellite can be a microsatellite with a 2–4 meter boom containing a three-axis search coil magnetometer with pico Tesla per root hertz sensitivity. A three-axis magnetometer may allow one to take directional measurements of the ELF magnetic activity, which permits an approximation of the location of the earthquake. Measurements from the satellite detector(s) are fed to a monitoring and analysis system on the ground, which notifies the user when a fluctuation greater than or equal to a selected level is detected. The monitoring system analyzes the measurement(s) from the three-axis magnetometer, the time/location of the satellite, the local magnetic flux vector (function of latitude), and approximates the location of the impending earthquake activity. The user can then deploy portable ground ELF magnetic detectors around the location of the impending earthquake, if stationary detectors do not already exist in that region. Portable sensors can be moved from location to location in a search pattern to identify the highest signal site and therefore, a closer approximation of the earthquake fracture zone.

The benefits of a combination ground and space system are substantial. The space part of the system provides early detection for a large region and the ground part of the system provides for reliable verification and constant monitoring of the ELF fluctuations.

Another aspect of the present invention is the use of one or more space based ELF magnetic detectors to verify measurements received by stationary ground detectors. As discussed above, it is impractical and/or costly to have ground detectors covering expansive regions. However, where it is feasible and cost-effective to have stationary ground detectors (generally in areas with high likelihood of earthquake activity and low population), satellites can verify the ground-based measurements and/or locate the source of the earthquake activity. This is especially helpful when stationary ground detectors do not happen to be in an optimal position for measurement but are in a position close enough to detect some ELF activity.

BRIEF DESCRIPTION OF THE DRAWINGS

The subject matter regarded as the invention is particularly pointed out and distinctly claimed in the concluding portion of the specification. The invention, however, both as to organization and method of operation, may best be understood by reference to the following detailed description, when read in conjunction with the accompanying drawings, in which:

FIG. 8 is a plot of the antenna sensitivity (calibration curve).

DETAILED DESCRIPTION OF THE INVENTION

Figure 1:
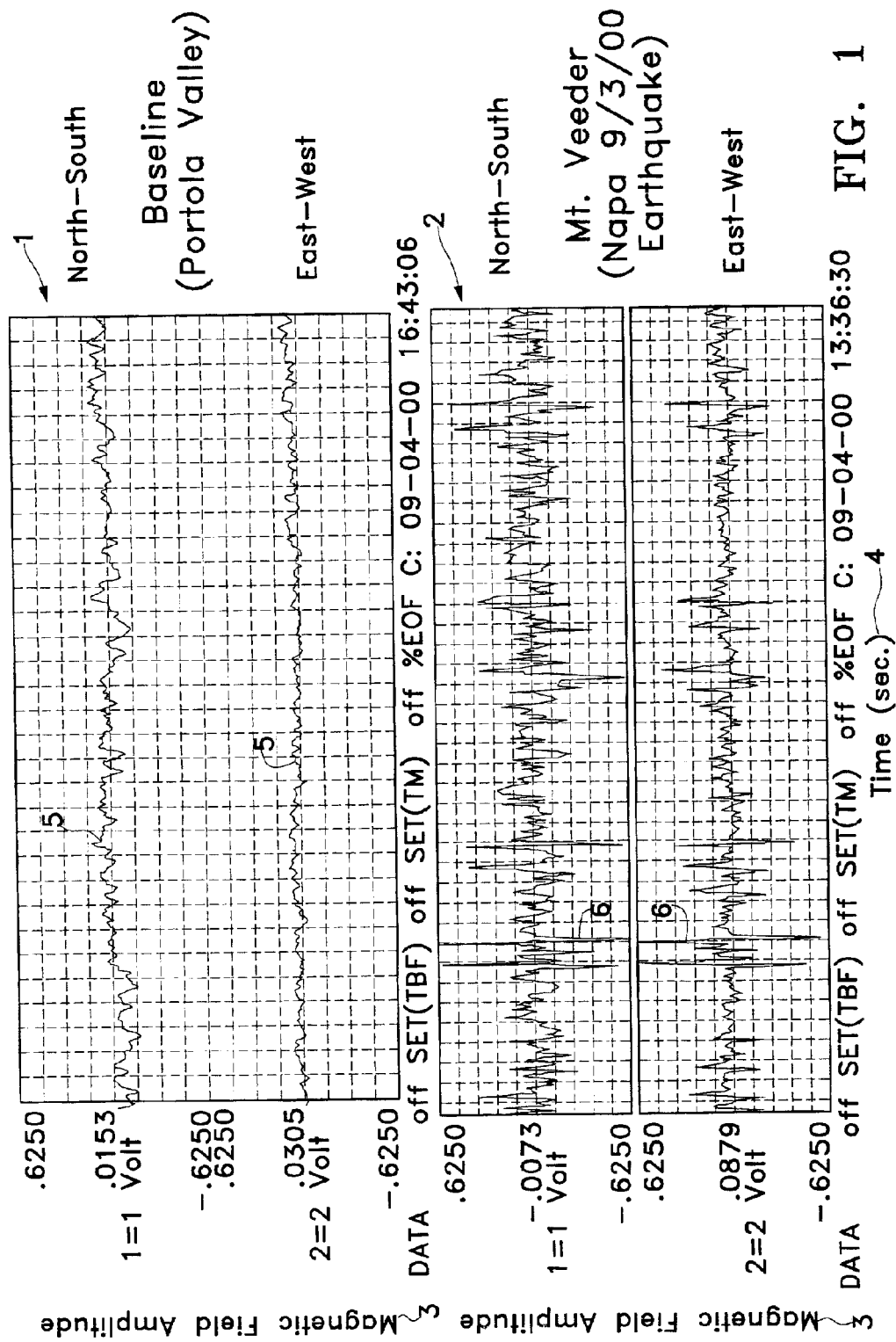
FIG. 1 is a depiction of earthquake based electromagnetic signal characteristics.

For purposes of this disclosure, ELF generally refers to the frequency range of the electromagnetic spectrum greater than 0 to about 500 Hz, and in this context, specifically refers to the frequency range of the magnetic field fluctuations detected by the ground-based and space-based signals emanating from an earthquake-ready site. The Graphs (1) and (2) in FIG. 1. illustrate ELF signals. The first graph (1) depicts baseline measurements taken in Portola Valley, Calif. The second graph (2) shows data taken with the same sensor, on the same day, at the epicenter of a Richter magnitude 5.2 earthquake in Napa, Calif. The top half of both graphs (1) and (2) show data taken from North-South antenna coils, and the bottom half show data taken from East-West antenna coils. The Y-axis (3) is the magnetic field amplitude, measured in volts at the output of the sensor. The X-axis (4) shows time, with each box representing 1 second of time (40 seconds total across the page). The baseline signature data (5) is a "normal" ELF signal, and represent about 5 pico Tesla per root hertz signal. The data obtained during an earthquake (6) shows short periods of 400 pico Tesla per root hertz signals, and the waveforms contain many impulsive signals indicating very chaotic magnetic signal behavior.

The ground-based sensor ELF frequency range is 0.05 to 4.5 Hz. This extremely low frequency (ELF) range is used since lower frequency EM waves propagate through the ground more efficiently than higher frequency waves. This is sometimes called the "skin effect", and is used extensively by magnetometers to map the underground resistivity of geologic structures for oil exploration (also known as magnetotelurics). The low frequency cutoff of 4.5 Hz was selected to eliminate a number of noise sources that could contaminate the data. These include harmonics of the electrical power transmission grid (15, 30, 60, 90, 120 Hz in the United States, and 5, 10, 25, 50 and 100 Hz in Europe and some other areas). Another major source of data contamination is the Schumann Resonance which is a 7.7 and 15 Hz signal caused by the thousands of worldwide lightning strikes which occur each second, and which resonate within the earth-ionosphere spherical waveguide at those frequencies.

The satellite ELF frequency range is set to detect frequencies from 0.05 Hz to 150 Hz, since the 2 previous satellite observations (Cosmos 1809 and Aureol 3) in 1989 observed unique ELF signatures in that frequency while flying over earthquake areas. After more data is collected from the satellites it might be determined that a lower upper bound frequency will yield better results.

Figure 2:
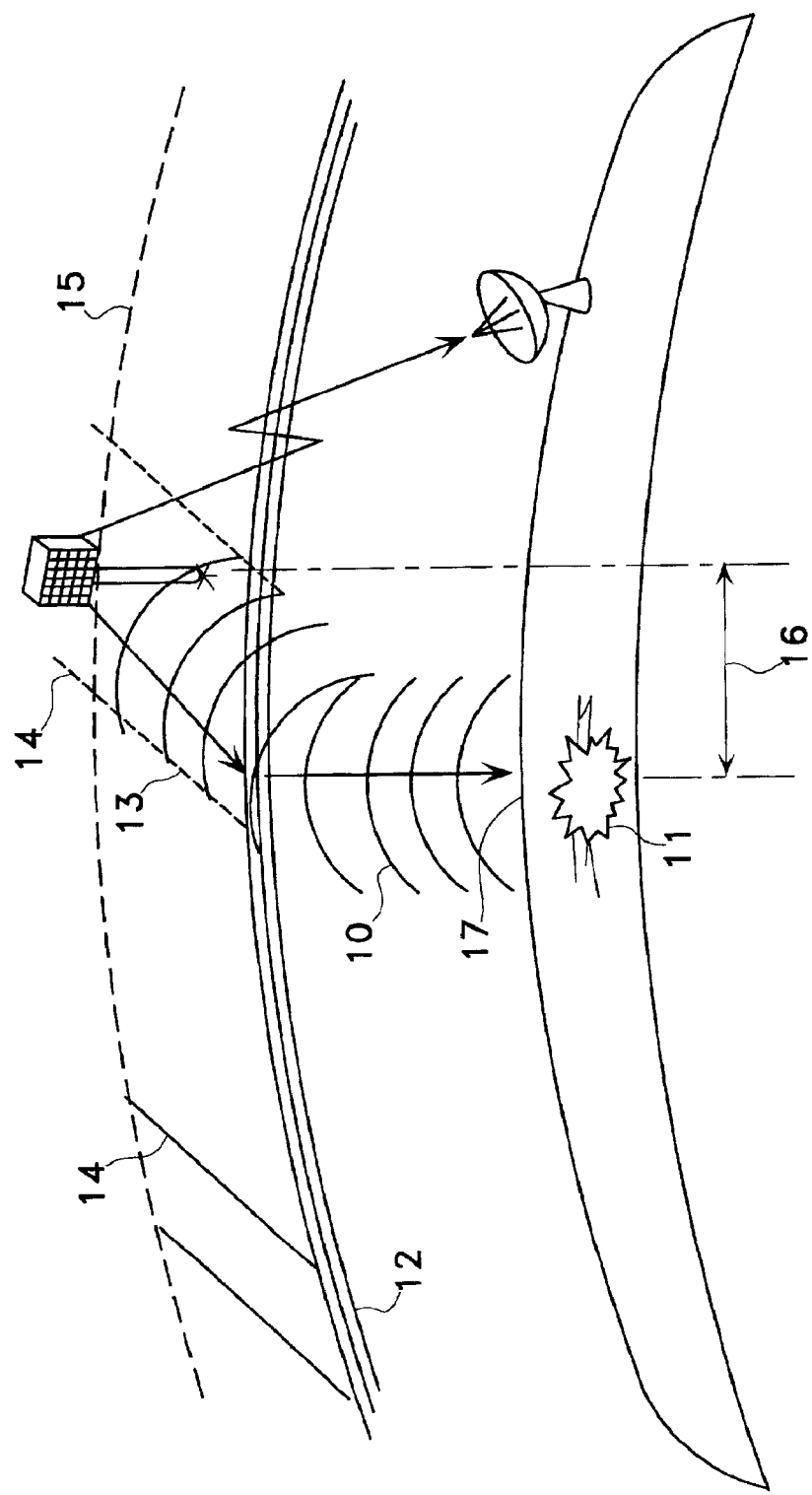
FIG. 2 is a depiction of the wave propagation path for an ELF wave from ground to orbit.

ELF signal propagation is somewhat unique, as shown in FIG. 2. The ELF signal (10) radiates straight up from the earthquake source location (11) until it encounters the earth ionosphere (12). The signal then is directed along a duct or waveguide (13) which follows the local earth magnetic field lines (14) for that latitude, and proceeds up until it reached the height of the satellite's orbit (15). On a global scale, the local magnetic field lines curve down (vertical) at the poles, and are horizontal at the equator, so at mid latitudes, they have some deterministic angle which forms this "transmission duct or waveguide" (13) up to the satellite's altitude. The bending of the propagation path results in an offset (16) between the site of the ELF origin area and the point at which the satellite crosses the duct and detects the signal. The offset can be calculated, and it is a function of the earth's magnetic field angle (horizontal at the equator and almost vertical at the poles), and the altitude of the satellite above the ionosphere. The offset can be calculated for each occurrence or signal detection, and the propagation point of origin of the signal on the earth (17) can be estimated.

The three-axis antenna and the time/signal history aids in the estimation of the offset of the signal to either side of the flight path. The three antennas mounted are oriented in-track, cross track, and vertical with respect to the satellite and the flight path. The relative ELF signal strength, observed by the 3 orthogonal antennas, would help determine the relative angle of the incoming signal as the satellite passes over the signal source. The invention in its preferred embodiment is set to monitor frequencies from 0.05 to 4.5 Hz in the ground-based monitor system, and 0.05 to 150 Hz in the space-based monitor system. The orbit of the space-based system was selected to provide a 4 day repeat cycle for lower to mid latitudes. High latitudes (Alaska and above), where the earth's magnetic field curls down to enter the earth at the poles, is extremely noisy from a magnetic field fluctuation standpoint, and would not provide "clean" data.

Figure 3:
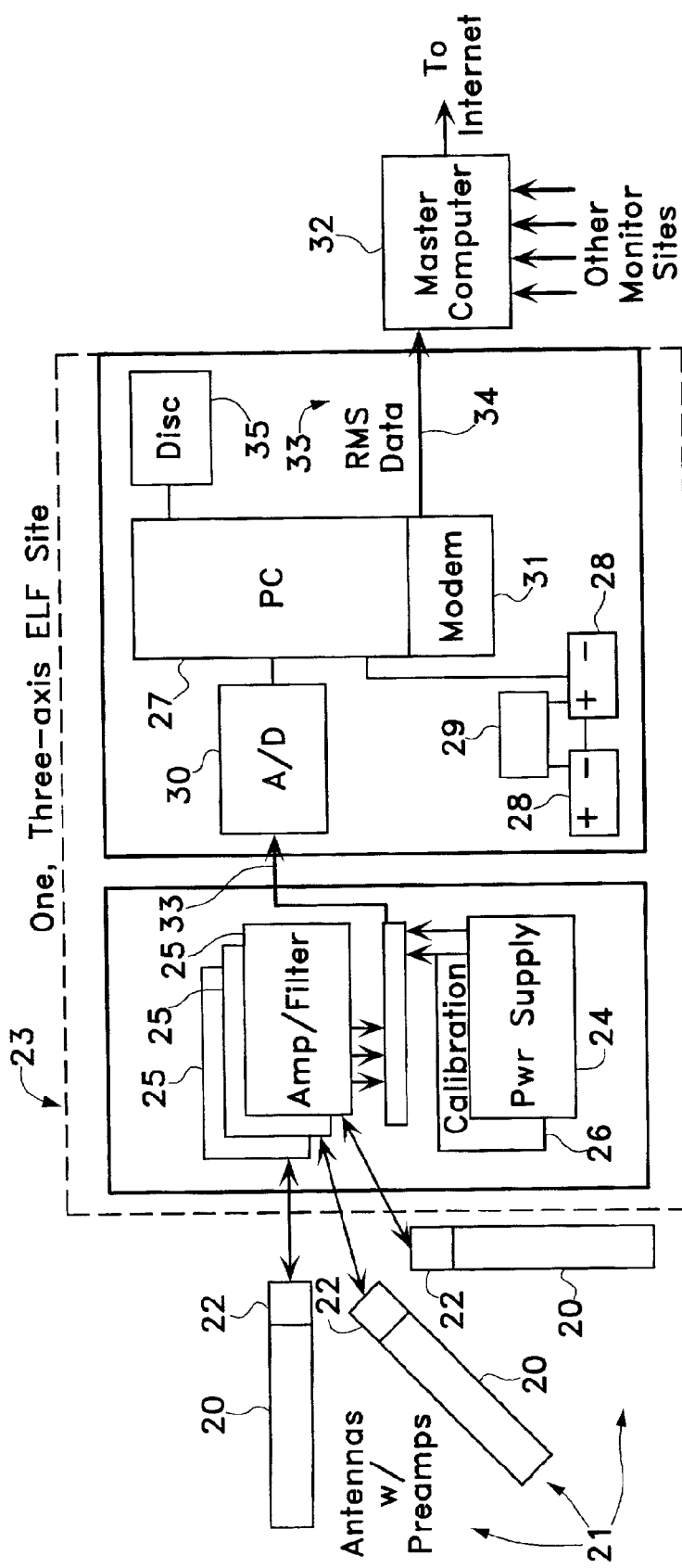
FIG. 3 is a depiction of the Ground System Block Diagram.

A block diagram of the ground-based system is shown in FIG. 3. A ground detector consists of 3 antenna coils (20) in an orthogonal arrangement (21), buried approximately 6 inches in the ground to protect them from wind motion. Each antenna coil has a preamp (22) attached next to the coil, connected to a buried enclosure (23) by about 3 feet of 8-conductor underground cable. The electronics are inside the buried enclosure. These electronics include a Power Supply card (24), 3 Amplifier/Filter cards (25), and a Calibration card (26), all plugged into a backplane printed circuit card containing +/−12 volt unregulated power, three channel output lines, and a calibration control signal line. A separate 8-conductor underground cable (33) extends from the buried electronics enclosure (23) to the computer (27) Attached to the computer (27) are two 12 volt batteries (28), and an uninterruptable power supply (29). The computer (27) includes a multi-channel, 12 bit analog-to-digital (A/D) card (30) and a modem card (31) or other kind of network connection card. Once a day, the computer (27) connects to a master computer (32) and downloads a series of root mean squared (RMS) data points (33) through a network connection (34). The master computer (32) receives all the remote units' data each evening, and converts the data to a graphical plots and uploads the plots to a website. The computer (27) also has a removable hard drive (35) that stores all the raw ELF data (at 20 samples per sec.) for 1 year or more. This allows the disc (35) to be removed and taken to a lab where the raw data to be scanned and analyzed if there is a large earthquake near the monitor.

The following descriptions refer to the ground system, but it applies as well to the space-based system, except that the low pass filter cut-off frequency has been re-tuned to 150 Hz for the satellite system.

The ground detector was designed to have the maximum sensitivity for a minimum cost, so the size of the antenna coils and type of electronics were selected to maximize the unit's sensitivity while remaining within a reasonable cost. A key feature of the system is its low cost. This allows a large number of monitoring units to be built for a reasonable cost, and these units can then be deployed every 20 miles along major faults so that they are within 10 miles of any earthquake on those faults. The distance from the monitor unit to the epicenter is a critical factor in detecting ELF from earthquakes. Other even more sensitive detectors have not been able to detect earthquake-related ELF if they were farther than 80 miles from the epicenter.

Figure 4:
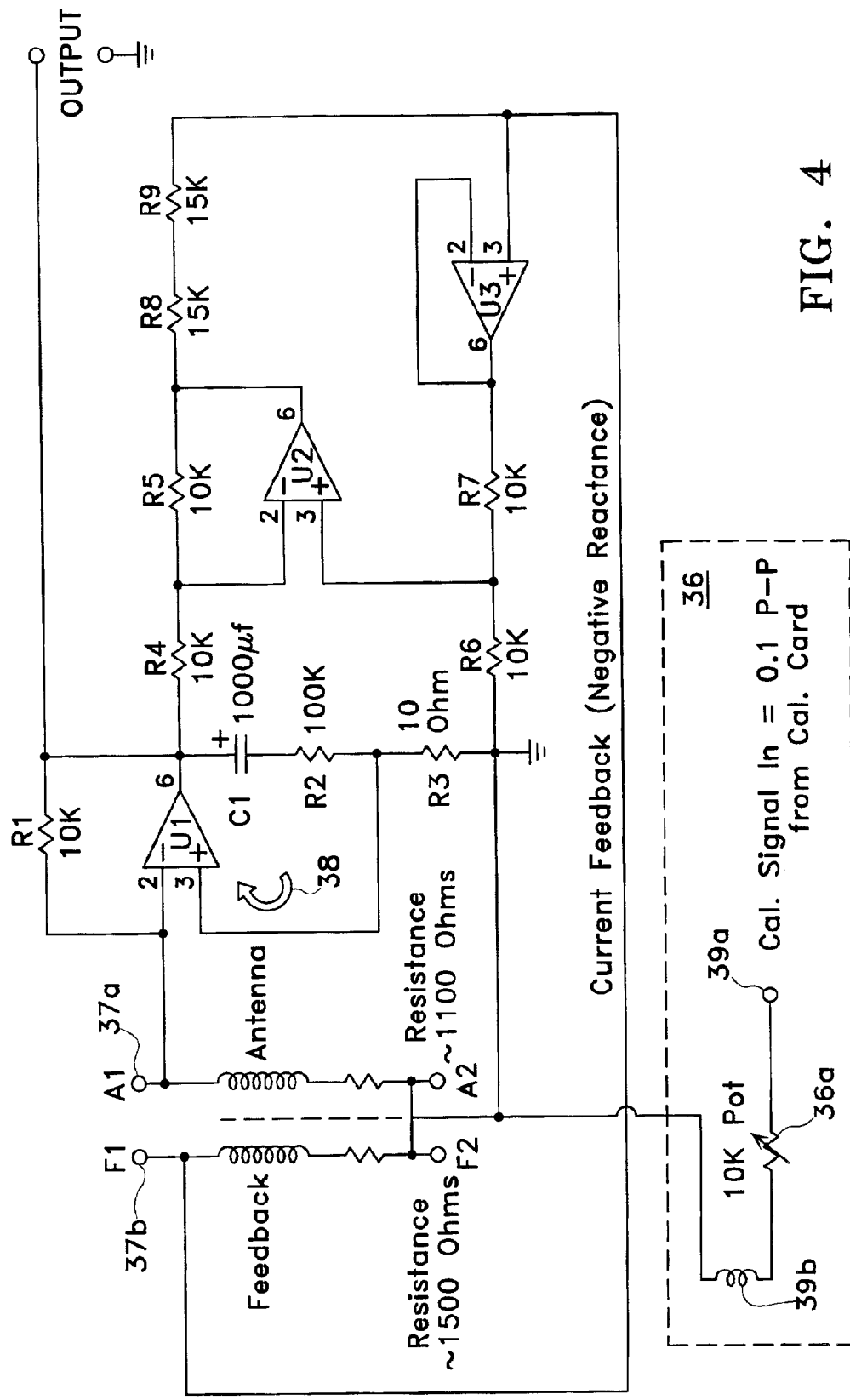
FIG. 4 is a circuit diagram of the antenna preamp of the preferred embodiment.
Figure 7:
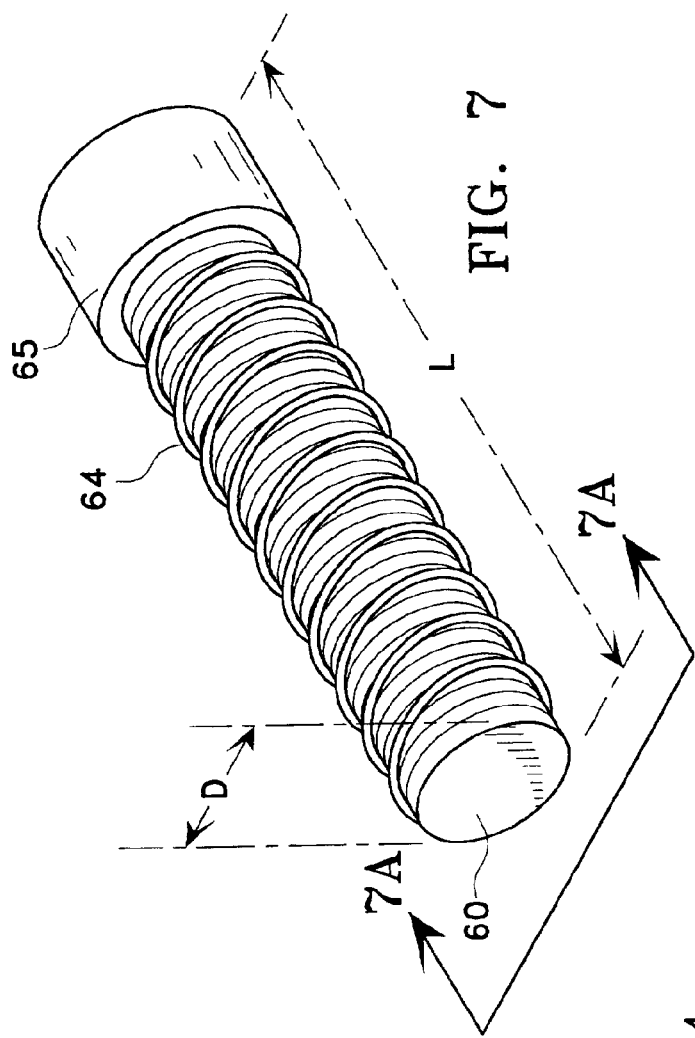
FIG. 7 is a diagram of an antenna coil construction of the preferred embodiment.

The Preamp (22) in FIG. 3 functions to increase the signal, reduce the noise, and increase the usable distance from the epicenter. FIG. 4 illustrates a suitable preamp that is similar to that disclosed in U.S. Pat. No. 5,296,866, which is hereby incorporated in its entirety by reference. The coil resistances shown are nominal values, but the number of turns, as shown in FIG. 7 and described infra, is more important. The preamp is necessary to amplify the minute signal emanating from the dual coils of the search coil magnetometer. It provides approximately 20 dB of amplification and does not have any filtering capability. It also provides positive feedback from the primary sense coil (37a) to the secondary or feedback coil (37b), as controlled by a negative resistance loop (38) to minimize the effective resistance of the coils and thereby reducing the coil noise in a signal-to-noise sense. The number of turns of the secondary coil must be fewer than the number of turns in the primary.

A calibration antenna (36) includes an input terminal (39a) that receives a calibration signal from a calibration circuit (illustrated in FIG. 6 and described further below). A 10-turn calibration coil (39b) wound on top of the dual antenna coils receives the calibration signal from the input terminal (39a) via a potentiometer or variable resistor (36a). This potentiometer limits the current received from the calibration circuit. This allows a calibrated amount of current to generate a calibrated oscillating magnetic field (3 nT per root hertz at 1 Hz) which then can be used to verify the health of the entire electronics chain in each of the 3 antenna circuits. The preamp preferably is mounted immediately next to the coils (37a) and (37b) to reduce any stray noise that may be picked up if it were mounted farther away from coils (37a) and (37b).

Figure 5:
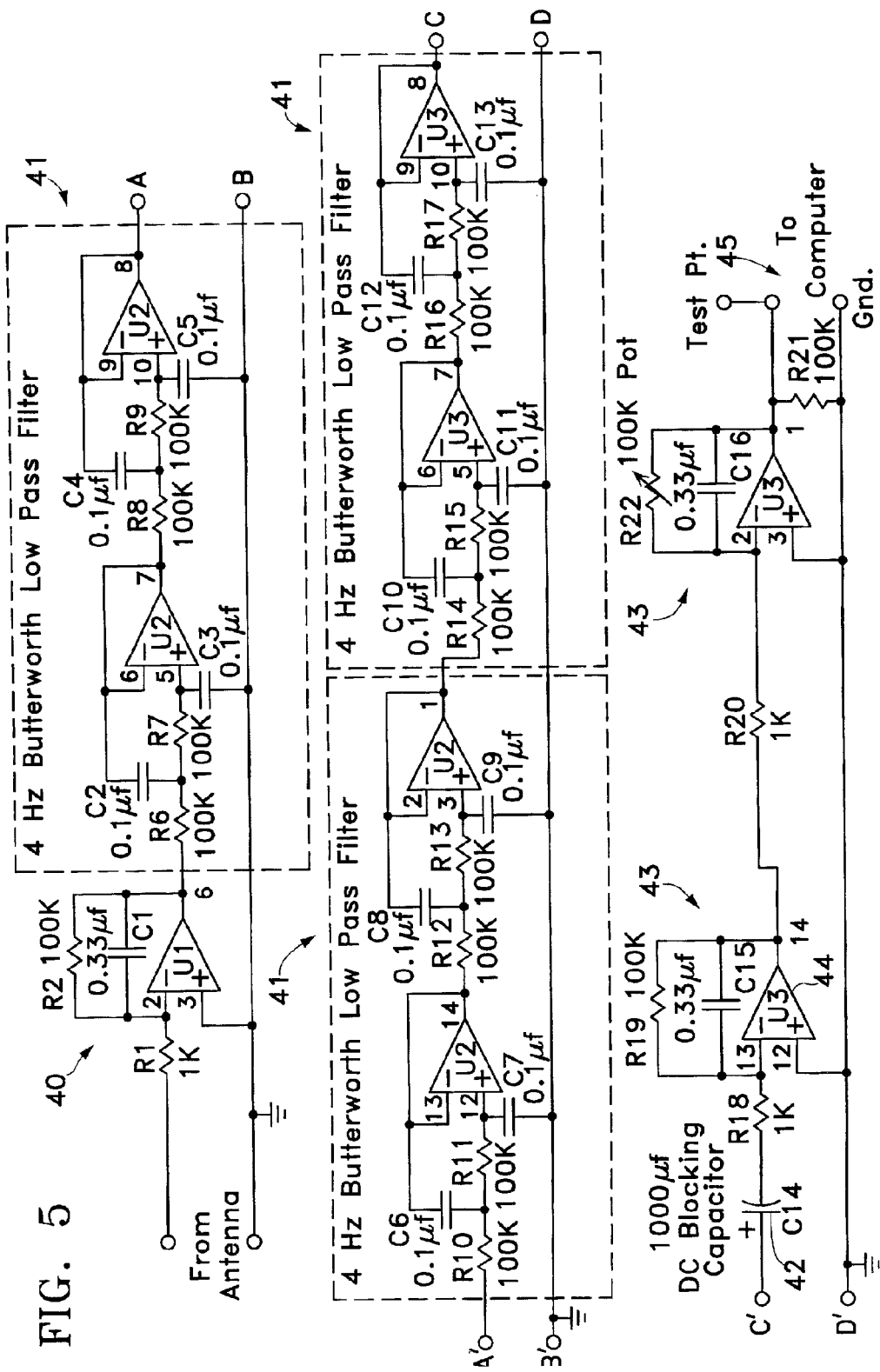
FIG. 5 is a circuit diagram of the amplifier/filter of the preferred embodiment.

The Amplifier/Filter circuit (25) in FIG. 3 is shown in detail in FIG. 5. The circuit amplifies the signal approximately 93 decibels. It also provides an active low pass filter (a series of 3 modified low pass Butterworth filters) (41) with a cutoff of 4.5 Hz and over 100 db of attenuation for 60 Hz noise signals. A significant feature of the circuit is the use of the 1000 microfarad capacitor (42) in series between the low pass filters and the final two stages of amplification (43). The use of this capacitor in conjunction with the high input impedance of the operational amplifier (44) provides an RC circuit with a very long decay time. This capacitor effectively blocks any DC voltage that characteristically builds up in multiple-stage operational amplifier circuits i.e. preamp (40) and low pass filters (41). This DC build up, if not corrected, would push the signal off from zero volts average, and would cause "clipping" of the signal after the high amplification in this circuit. The signal initially starts above the highest output voltage or "off scale" but slowly decays to a zero average as the offset voltages at the input to capacitor (42) discharges through the negative input to an operational amplifier, through the amplifier to ground (44). Low frequency signals are allowed through the low pass filters (41), and the DC level will automatically decay to zero volts. If this feature were not present, the circuit would need to be constantly readjusted on the Amp/Filter card.

Figure 6:
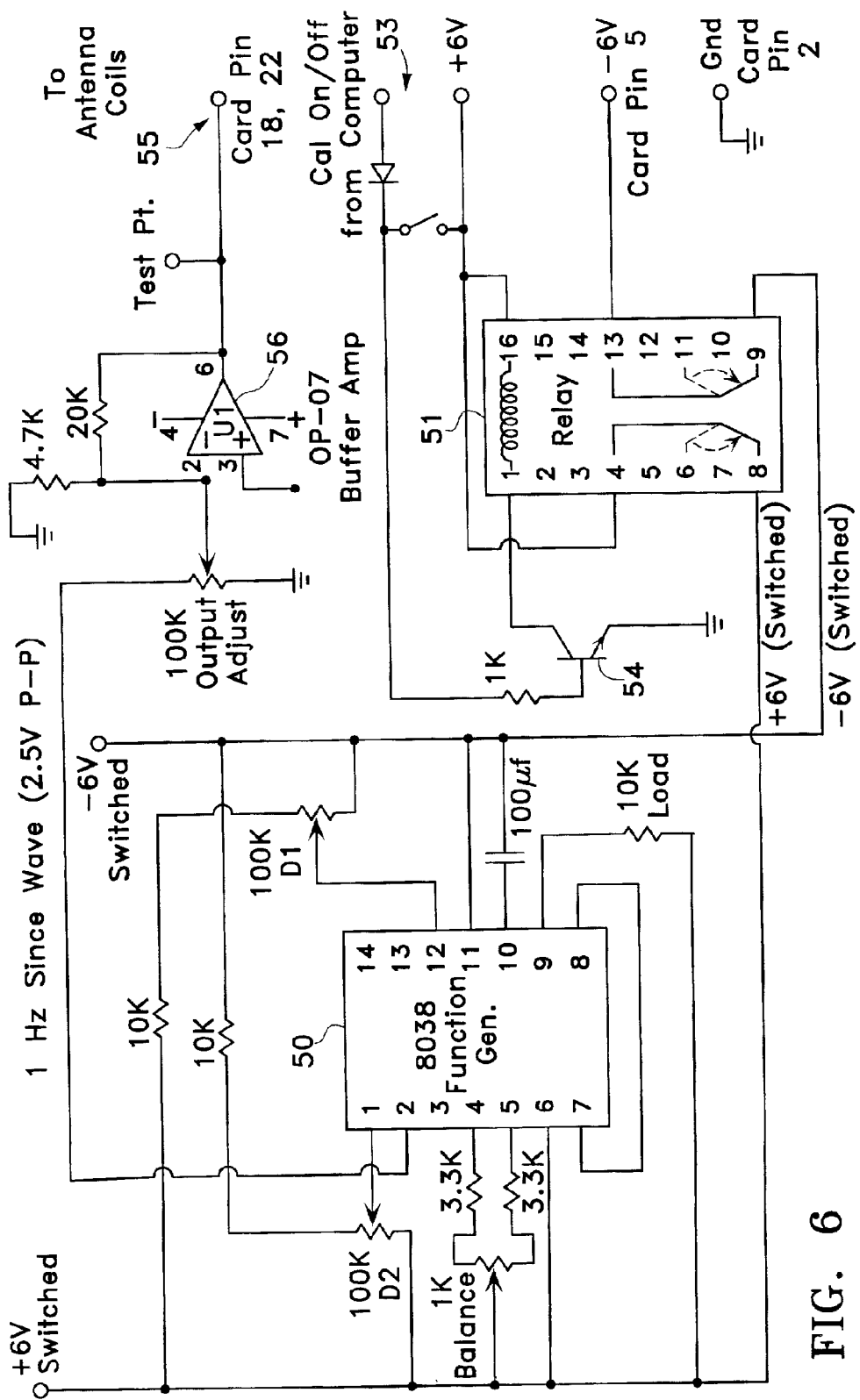
FIG. 6 is a circuit diagram of the calibration circuit of the preferred embodiment.

The calibration circuit (24) in FIG. 3 is shown in detail in FIG. 6. The circuit is necessary to inject a known 1 Hz calibration signal, generated by a standard 8038 function generator (50), into the antenna system to verify that the system is functioning and the calibration (antenna sensitivity, preamp gain and amplifier gain) has not changed. The signal is automatically commanded "on" by the monitor system PC for one data cycle (300 sec.). This is done periodically, for example twice each day, to check the performance of the system at the cool and hot part of each day. The calibration On/Off signal is generated under computer control and is output through the serial port of the computer to the on/off control pin of the calibration card (53). This "high" control signal forward biases the base of an NPN transistor (54) and allows the +6 volts at the relay coil (51) to conduct to ground and activate the coil, allowing +/−6 volts to be sent to the function generator 8038 (50). This "hard power on/off" technique is critical because if the 8038 were allowed to remain on all the time, its output 1 Hz signal would be seen by the amplifiers in the Amplifier/Filter cards at all times, even if the signal were not applied to the calibration coil. This is due to the high gain of the Amplifier/Filter card and close proximity of the circuit boards (signal coupling). The function generator (50) must remain unpowered at all times until the calibration sequence commences. The output of the 8038 function generator (50) at pin 2 of the 8038 chip is sent to the operational amplifier (56) so that there is enough current driving capacity to power all 3 antenna calibration coils in the 3 antennas shown in FIG. 3. The output of this current amplifier (56) is sent through the backplane to the input (39a) of the calibration antenna (36) via an output terminal (55). The 1 Hz signal is injected into the separate 10-turn coil (39b in FIG. 4) which is wound over the primary and secondary coils, and injects a 3 nT per root hertz signal, by induction, into the antenna, and provides an end-to-end check of the monitoring system.

Figure 7A:
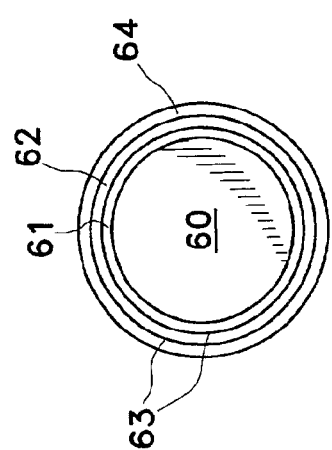
FIG. 7A is an alternate view of a diagram of an antenna coil construction of the preferred embodiment.

The detailed design of the antenna in FIG. 7 and FIG. 7A starts with a core of HyMu-80 (60), an alloy that has a high magnetic permeability, and provides a low "resistance" path for magnetic signals. Both the primary (61) and secondary (62) coils use AWG 36 annealed and coated copper wire (63). The primary coil (61) has about 27,200 turns with a resistance of 900 −1050 Ohms, while the secondary coil (62) has about 26,000 turns with a resistance of 1400 −1550 Ohms. The secondary coil (62) is wound over the primary coil (61) as shown in FIG. 7A. The primary coil (61) senses the magnetic field fluctuations from an ELF signal, and feeds it to a preamp as described in FIG. 4. The signal is amplified by the circuit in (38 in FIG. 4) and fed into the secondary coil (62) in a feed forward fashion to lower the effective resistance of the overall coil configuration. This is important to reduce the effective resistance of the coils, and the corresponding noise level of the induction coil. The 10 turn calibration coil (64) is wound over the secondary coil (62) and spread over the coil length of 10 inches. The diameter of the core (60) is 0.25 in and the other coils are wound radially and increase the resulting diameter to approximately 0.625 in. The overall length of the core (60) is 12 inches and the windings cover 10.5 inches. Each antenna can be wrapped in one turn of copper foil, with the start and end of the copper foil taped and insulated so as to prevent circulating currents. The foil is connected to instrument ground to remove any electrostatic charges that might build up on the coils and give false readings. The electrical connections between the antenna and the preamp are made in the PVC pipe enclosure at the end of the antenna (65).

The antenna sensitivity is plotted in FIG. 8. This graph is a plot of the antenna sensitivity at a 1 hertz frequency point, with the Y-axis in units of pico Tesla per root hertz (Y-axis). The X-axis is the antenna output measured at the output of the Amplifier/Filter card, measured in milli-volts root mean squared (rms). The maximum output (71) is limited by the voltage swing of the operational amplifiers (+/−4.8 volts) and corresponds to 5 nT per root Hertz at 1 Hz. The lowest signal discernable signal (noise floor) (70) is very difficult to measure due the natural and man-made background noise when calibrating, but it is estimated to be approximately 5 pico Tesla per root Hertz at 1 Hz. (or about 6 mv rms).

Figure 9:
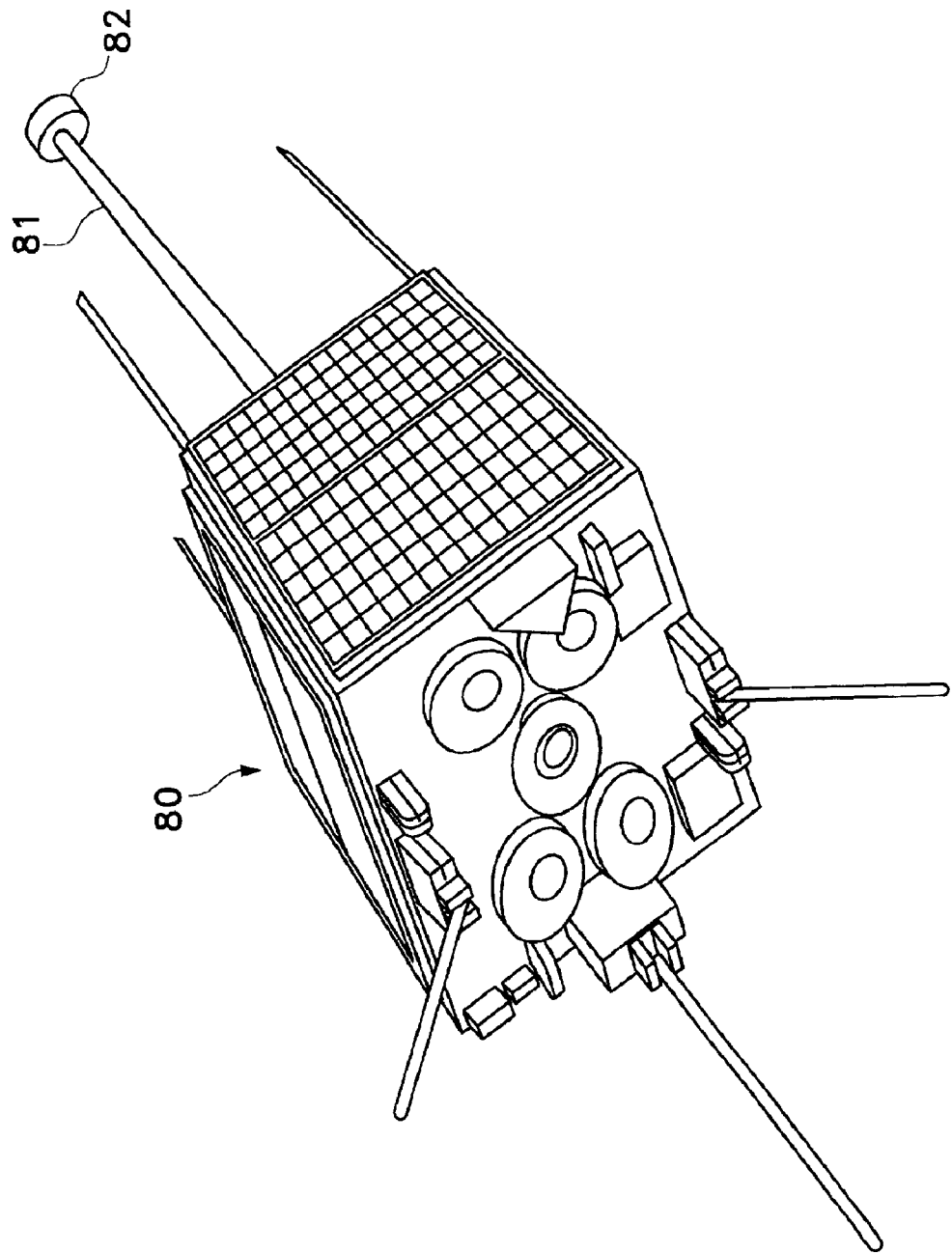
FIG. 9 is a figure of the microsatellite, boom, and 3 axis antenna coils.

The satellite-based ELF detector in FIG. 9 shows a typical 60 kg class microsatellite (80) with a 3–4 meter boom (81) and the magnetometer (82) mounted at the tip of the boom.

Figure 10:
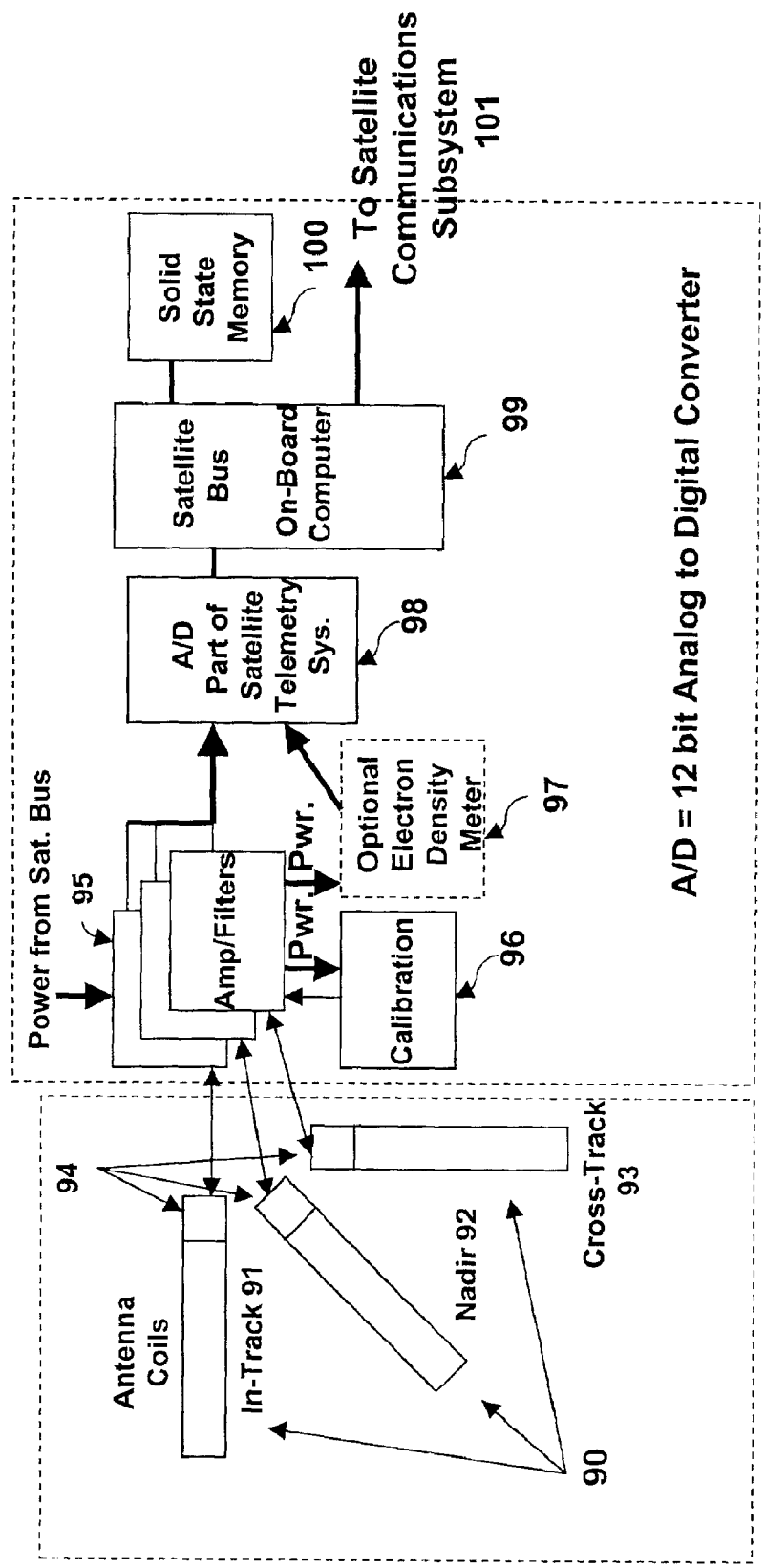
FIG. 10 is a depiction of the satellite instrument block diagram.

The block diagram of the satellite system is shown in FIG. 10. The coils (90) and the preamps (94) are mounted at the end of a 3 meter boom FIG. 9 (82) to avoid stray noise from the main satellite body (bus). This noise could come from the solar array controllers, momentum wheels, torque rods, and other electrical sources. These noise signals must be kept from contaminating the signal at the input to the antenna coils, and the distance of 2–4 meters is designed to accomplish this. One satellite uses 3 antenna coils (90), 3 preamps (94), 3 amplifier/filters (95), a calibration circuit (96), and an optional electron density meter (97) to comprise one instrument. The Electron Density meter (97) is an instrument that may be used if there is space and weight margin to mount the device. Its purpose is to sample the ambient electrical environment around the satellite and determine if there are variations in the plasma concentrations.

The space-based unit illustrated in FIG. 10 uses the satellite's own 12 bit A/D converter (98), and stores the raw data in its on board computer (99) and on board memory (100) until it can transmit the data to a tracking site/ground terminal through the satellite's communication link (101). The signal is then received by a ground-based antenna, where it is stored, formatted, and transmitted over commercial lines to the Control Station (shown in FIG. 12).

The satellite antenna mounting is important because the extreme sensitivity of the sense coils requires that they be located 2–4 meters from the satellite bus. The antennas need to be oriented in a three-axis orientation, as shown in FIG. 10: In-track (91), Cross-Track (93), and Nadir (92).

Figure 11:
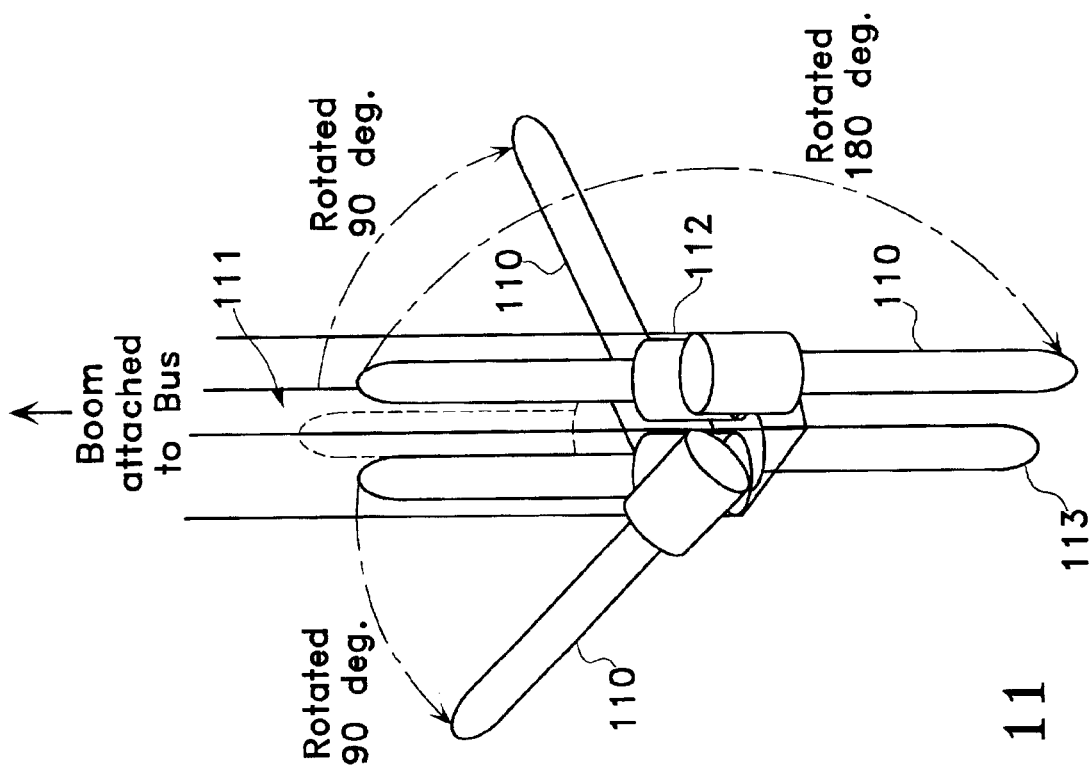
FIG. 11 is a diagram of the antenna mounting scheme of the preferred embodiment.

FIG. 11 represents one possible mounting scheme that allows the three-axis antennas (110) to be stowed in a minimal volume for launch (111). Each antenna is folded up to one plane of the square boom, and then can be deployed into the three-axis orientation. When the boom deploys after launch, each antenna swings into position by using a spring-loaded pivot point with a mechanical stop (112). An optional fourth antenna may be used (113) if necessary. The three primary antennas will have a frequency cutoff of 150 Hz, selected to duplicate the frequency response of Cosmos 1809 satellite flown in 1989. The fourth antenna (113) (nadir facing) will have a frequency cutoff of 5 Hz in order to determine if the increased sensitivity and reduced bandwidth will result in a more accurate detection of the ELF signals from space. Previous satellites utilized a single axis antenna, which only provided a single axis magnitude reading of the ELF signal. Many passes over the earthquake area were required to determine the origin of the signals. A three axis magnetometer will indicate which side of the satellite path contains the maximum signal, and combined with the time history of the signal, calculations can be made to determine the propagation path for the signal. Using the magnetic (dip) angle at the latitude in question, will also result in a much more accurate estimation of the origin site for the ELF signal.

Figure 12:
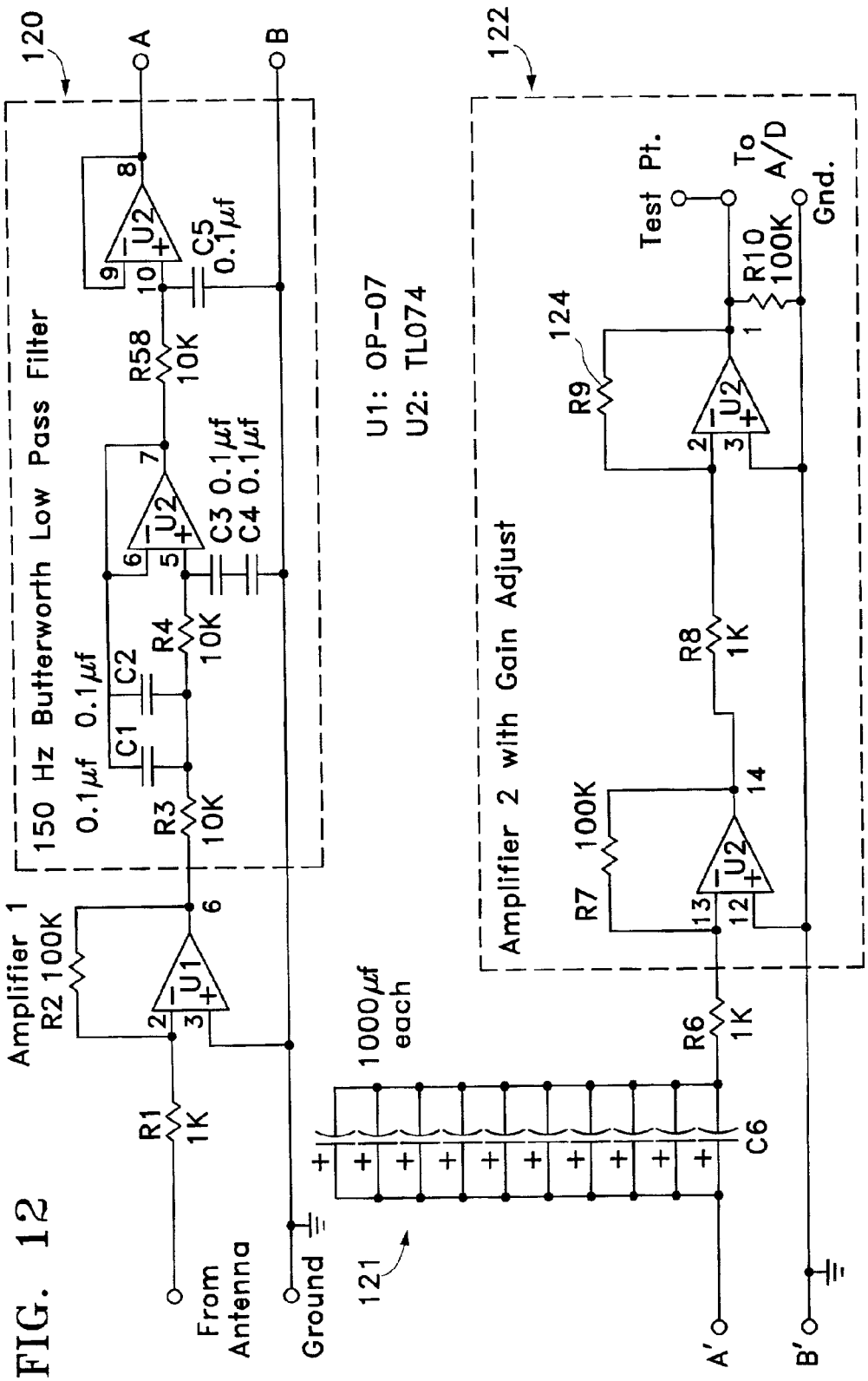
FIG. 12 is a figure of the satellite antenna with 150 Hz capability.

The satellite version of the ELF amplifier/filter with the 150 Hz cutoff is shown in FIG. 12. The main differences between the satellite and ground amplifier/filters are the capacitor values in the Butterworth filters (120), and the lack of filter capacitors in the amplifier sections (122). The Blocking capacitors are set up to be a parallel bank of ten 100 uf tantalum capacitors (121) to replace the single 1000 uf electrolytic capacitor in the ground circuit. Electrolytic capacitors will disintegrate in a vacuum environment, so smaller tantalum capacitors must be used instead. The value of resistor (124) is selected to produce the proper gain in the final amplifier stage.

Figure 13:
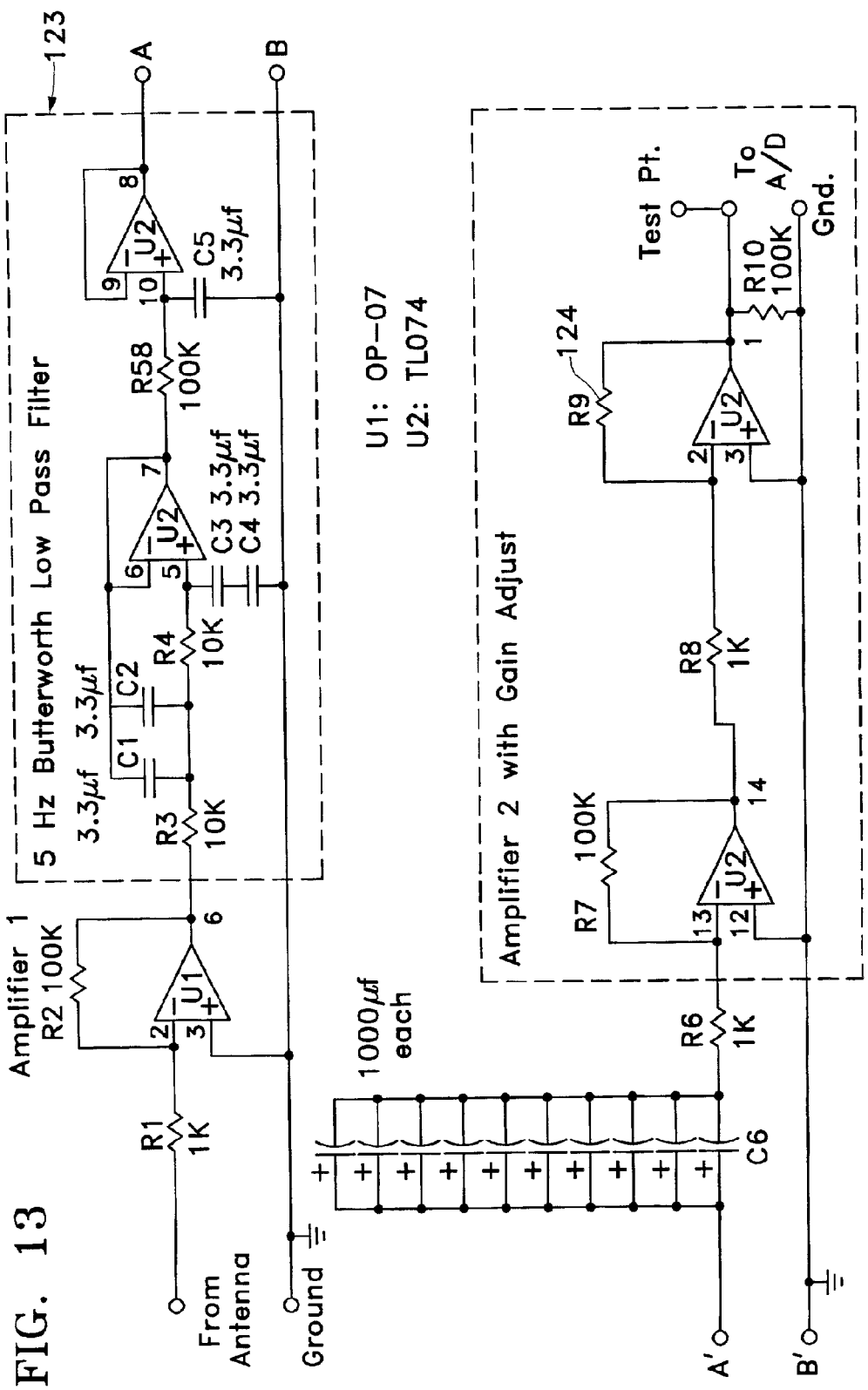
FIG. 13 is a figure of the satellite antenna with 5 Hz capability.

FIG. 13 depicts the same satellite amplifier/filter as in FIG. 12, but tuned to 5 Hz in the Butterworth low pass filter section (123).

Figure 14:
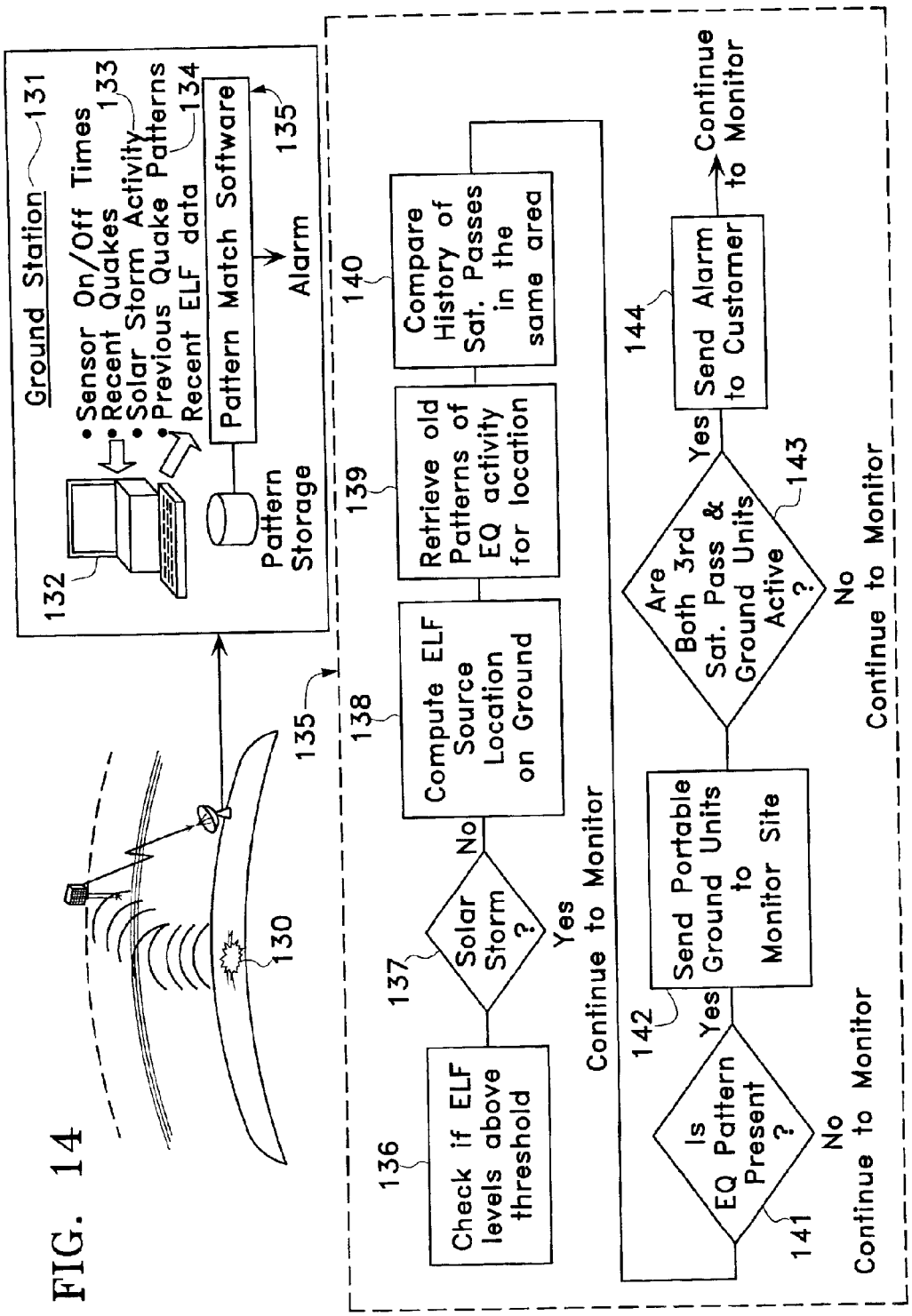
FIG. 14 is a figure of the combined satellite/ground monitoring technique.

The data monitoring facility block diagram is depicted in FIG. 14. The facility receives the first stage ELF alarm data from the satellite (130). The main component of the ground station (131) consists of a main processor (PC) (132) with storage for several years of data. The facility has internet connections to the NOAA website for solar flare data (133) and the USGS websites for worldwide earthquake data (134). The facility has software to store and retrieve the satellite data, and to scan through it to identify active data sets (135, with more detail in lower box of FIG. 14).

The high level description of the software processing is shown, starting at (136). The ELF data is downloaded and reviewed for magnitudes above a threshold value (136) set in a database. If the data shows that most of the ELF signals are high, the program checks the NOAA website to determine if a solar storm is active (137). Solar storms contain large quantities of energetic particles ejected from solar corona regions. These particles interact with the earth's magnetic field and ionosphere to generate ELF signals, and these solar-induced signals generate noise levels that can cause false indications, and should not be interpreted as earthquakes below the flight path. If a solar storm is detected, then the program will ignore the data and continue monitoring. If it is determined that the ELF signal was not related to a solar storm, a routine (138) in the software will then calculate the reverse propagation path from the satellite back down to the ground, based on the local magnetic field line vector at the satellite's current location. A routine will then scan the active data sets for patterns that have been identified to be "typical" of active earthquakes in this general area (139). Sequential satellite passes over the area will be scanned to see if a repeating "high" signal is present (140, 141), and if such a signal is present, then portable ground monitors will be sent to the site (142). If no ground signals are found in the suspect area on the ground, the process will then ignore this data and continue to monitor for new ELF signals. If the ground monitors do correlate the detection of ELF signals in approximately the same area, then the ground monitors will be used to perform a systematic area search (143) to determine if there is a centroid for the elevated signals. The centroid refers to the center of the error ellipse whose area decreases as more data is observed and as the location of the ELF signals are better defined. The key to reducing false alarms is to test that both satellite and ground monitors provide correlation of the ELF signals before a warning message (144) is conveyed to the customer (government, industry, or private subscribers).

The central data monitoring facility in FIG. 14 will have access to the satellite data (once every 4 days for a single satellite, once every 2 days for a 2 satellite constellation, etc.) and all of the fixed and portable ground-based monitors. Correlation of both the satellite and ground monitors is very important so as to keep a record of the nature of the signal (is it increasing in magnitude, expanding in area, and becoming more chaotic?) These are all signs of a larger extent of the pre-earthquake process.

Figure 15:
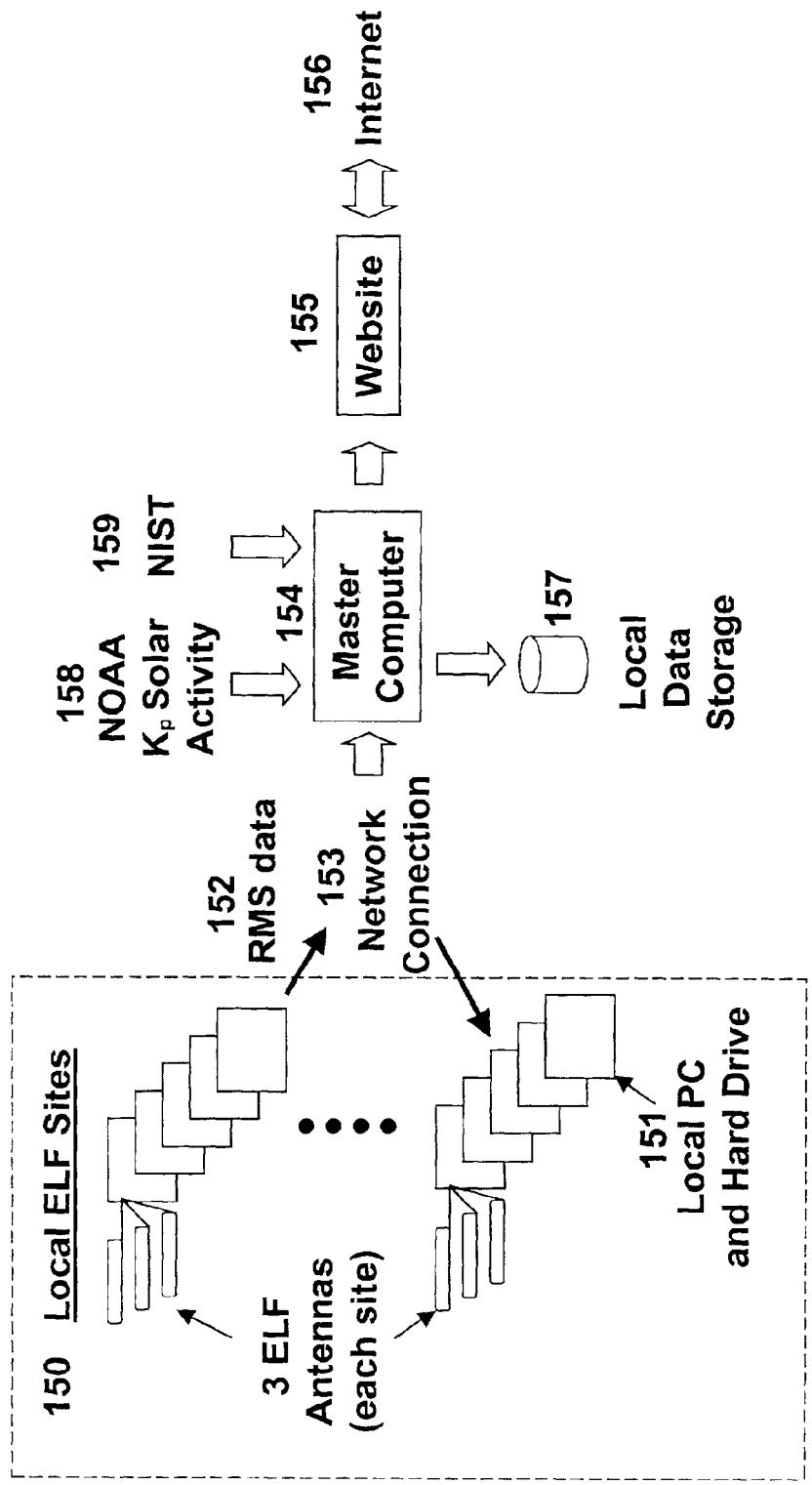
FIG. 15 is a figure of the Ground Monitoring Data Flow.

FIG. 15 describes the ground-based monitoring systems. They are designed to require minimal human attention. The data from each of the 3 antenna coils in a typical ELF monitoring site (150) is sampled at 20 samples per second. Both raw and summary data are stored on the local PC's hard drive (151). 300 seconds of the raw data is used to calculate a summary of the ELF data. This summary is a root mean square (RMS) average of each 300 second sample of raw data. The local monitor's software is designed to automatically wake up at a predetermined time and download a summary of the last 24 hours of RMS data (152) via a network connection (153) to a Master Computer (154), located at the data monitoring facility. The Master Computer (154) receives all ground system downloads from the monitor sites each night, and stores all the data on a local hard drive (157), with data tapes for long term storage. The Master Computer then converts all the RMS data to graphical plots, and uploads these to a server (155), which acts as the website host and allows viewing on the internet (156). NOAA solar activity data is accessed from the Master Computer in order to determine if the ground system data is contaminated by a solar storm (158). The Master Computer also interrogates the National Institute of Standards and Technology (NIST) website (159) each day and adjusts the Master computer clock to within 100 ms of true time.

The download process from the Monitor stations to the Master Computer also updates each Monitor computer's clock based on the newly updated Master Computer clock. This is important because the clocks in each monitor computer drift at different rates, and would eventually be out of synchronization by more than 3–5 minutes, causing one computer to try to download its data at the same time as another computer was downloading its data.

Special updates of the Monitor system computer's software can also be downloaded from the Master computer to each Monitor computer upon operator command. This allows updates to be accomplished without sending discs out to each station and requiring manual process of loading and verifying the updates.

Some ground sites may be located permanently along known active fault lines. The location of the ground sensors should be within 1 mile of the local fault line. Observations were made by taking readings around the epicenter one day after a magnitude 5 earthquake near Napa, Calif. in September 2001. These readings were taken at the epicenter, and then taken 4 miles from the epicenter in each quadrant to check the relative signal strength of the ELF signals. It was discovered that the signal was reduced several dB for every mile away from the epicenter, with the signal falling fastest when moving perpendicular from the fault line. The sensitivity of our system, the signal pattern detected at the Napa earthquake, and the reported signals from the Loma Prieta earthquake indicate that the future placement of these ELF systems should be every 20 miles along the fault. In this way, at least one system will be located within 10 miles of any earthquake near the fault being monitored, and the signal will be strong enough to be detected.

Figure 16:
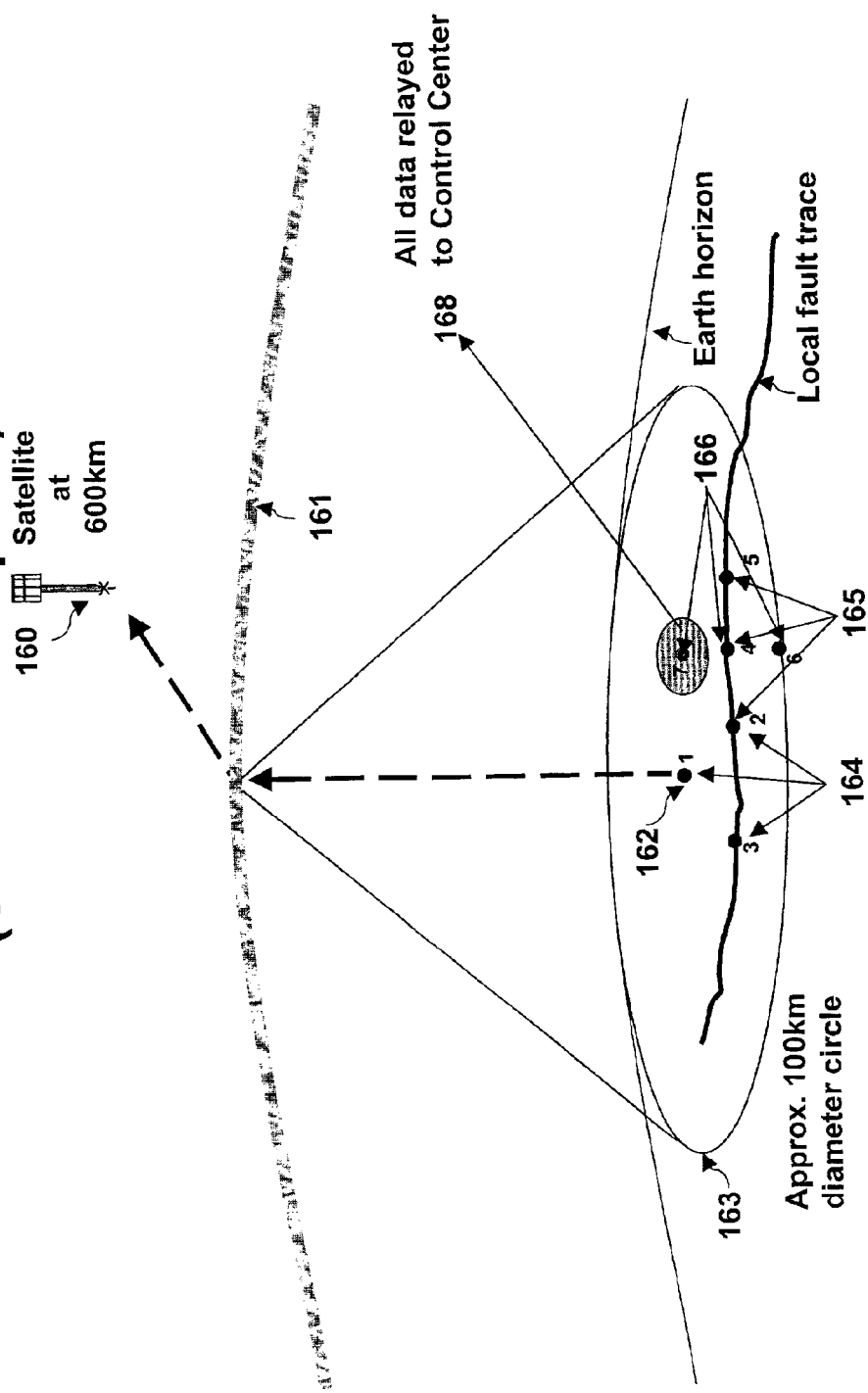
FIG. 16 is a figure of the Earthquake Search strategy (3-Point Compare).

The combination of the satellite and ground-based monitors is very important in the process to prove that space-based and ground-based monitors are detecting the same signal. Once this has been done, there will be more confidence that the satellite alone can detect earthquake signals in areas where there are no ground monitors available. This process, depicted in FIG. 16, will use the satellite (160) to detect signals in a first alert mode. The centerpoint of the estimated signal source (162) will be transformed from the satellite (160) back through the ionosphere (161) to a circle on the ground (approx. 80–100 km diameter circle) (163). The ground monitors will then be deployed to start a "3-Point Compare" pattern starting at the estimated signal centroid (162) named location 1 in this example. Knowledge of the local fault location would dictate that the next two monitors would be set up at points 2 and 3 for the first 3-Point pattern (164). The separation of the monitors may depend on the existence of local roads, but in general, they are about 5–10 km apart. It is important that all 3 monitors are started at the same time (with radio or cell phone coordination) so a 5-minute segment of data can be taken, and a corresponding root-mean-squared (rms) average can be taken at each site. The largest rms value should indicate the monitor location closest to the signal source. Taking data sample in groups of three allows the overall signal to vary up and down, while allowing the monitor closest to the source to yield the highest reading of the three monitors over the same span of time. In this example, point 2 has the highest rms value. The monitor at location 2 is kept in place, and satellites capable of detecting ELF magnetic fluctuations, which as discussed above, is a the other monitors are moved to the second cluster (165) so the 3 monitors are at positions 2, 4, 5. Three simultaneous readings are taken for 5 minutes. The highest rms reading is at position 4 (in this example), so the monitor at position 4 is set, and the other two monitors are moved to a "cross-track" orientation to the fault to see if the source is off the main fault trace. The third cluster (166) is now set up at positions 4, 6, and 7. The highest reading is at position 7, and this is the new estimated signal source location. The process can continue for additional clusters of 3 monitors to get closer source estimations, but in large earthquakes, a long section of the fault may be fracturing at the same time, and a high signal may exist over a larger area.

The portable unit used in this example is identical to the fixed ground monitors except they use laptop PCs, battery-powered electronics, and the electronics are packaged in portable containers. Their three-axis coils, preamplifiers, and amplifier/filters have the same sensitivity as the fixed site monitors, but use the laptop computers to collect the data. Potential earthquake locations which have no telephone infrastructure (hardline phone systems or network connections) will be connected by cell phone, satellite communication phones or other wireless technology (167) to allow the data to be fed back to a central computational facility (131) in FIG. 14.

The invention and the manner and process of making and using it are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

I claim:

1. A method of monitoring an earthquake comprising:
    a) detecting an electromagnetic signal emanating from and characterizing an earthquake using at least one satellite;
    b) using said electromagnetic signal detected by said satellites to locate an area on earth from which the electromagnetic signal was generated;
    c) using at least one ground detector to verify the existence of said electromagnetic signal; and
    d) using said ground detectors to precisely locate said electromagnetic signal.

2. The method of claim 1 wherein said satellite is capable of detecting an electromagnetic signal from 0.05 Hz–150 Hz.

3. The method of claim 1 wherein said satellite uses a three-axis antenna.

4. The method of claim 1 wherein said ground detectors are capable of detecting an electromagnetic signal from 0.05 Hz to 4.5 Hz.

5. The method of claim 1 further comprising the step of:
    e) relaying RMS data to a control center using said ground detectors.

6. The method of claim 5 further comprising the step of:
    f) forecasting the occurrence of an earthquake given the data received in steps (a) through (e) over a period of time, typically 1–2 weeks prior to a large earthquake.

7. A satellite and ground system of monitoring an earthquake, comprising:
 a) at least one satellite comprising:
  i) a 3-axis search coil magnetometer for generating an extremely low frequency (ELF) data signal in response to an electromagnetic signal emanating from and characterizing an earthquake;
  ii) data storage that can store the ELF data signals, along with the time the signal was detected and the location of said satellite when said ELF data signal is detected; and
  iii) a transmitter to transmit said data through a cooperating ground station to a control center after said satellite collects said ELF signal;
 b) one or more portable ground detectors comprising:
  i) a 3-axis search coil magnetometer
  ii) data storage that can store raw ELF data, location of ground detector and time said ELF data was received; and
  iii) a transmitter to send said ELF data to said control center;
 c) a control center comprising:
  i) a network connection to the internet or other network to allow the uploading and downloading of earthquake related data
  ii) one or computers to process said earthquake related data.

8. The system of claim 7 wherein said axes of said 3-axis search coil magnetometers are normal to each other.

9. The system of claim 7 wherein said transmitter of said satellites transmit said data through a cooperating ground station to a control center within 2 revolutions (200 minutes) of the satellite collecting said ELF data signal.

10. The system of claim 7 wherein said 3-axis search coil magnetometers in the satellites have a sensitivity of at least 10 pico Tesla per root Hertz over a bandwidth of 150 Hz.

11. The system of claim 7 wherein said 3-axis search coil magnetometers in the ground detectors have a sensitivity of at least 10 pico Tesla per root Hertz over a bandwidth of 4.5 Hz.

12. The system of claim 7 wherein said data storage in the ground detectors is removable.

13. The system of claim 7 wherein said data storage in the ground detectors contain root mean squared summary data.

14. The system of claim 7 wherein said ground detectors further comprise an automatic signal centering circuit.

15. The system of claim 7 wherein said ground detectors further comprise a calibrator circuit that injects a 1 Hz known magnetic field into each antenna of said 3-axis search coil magnetometer.

16. The system of claim 7 wherein said ground detectors further comprise a power relay to apply power to the calibration signal generator only during the calibration sequence.

17. The system of claim 7 wherein said ground detectors further comprise copper foil shielding for all 3-axis search coil antennas.

18. The system of claim 7 wherein said satellites further comprise copper foil shielding for all 3-axis search coil antennas.

19. The system of claim 7 wherein said satellites further comprise a boom structure, 2–4 meters long.

20. The system of claim 7 wherein said satellites further comprise an electron density instrument on the satellite bus.

21. The system of claim 7 wherein said satellites further comprise a fourth antenna.

22. The system of claim 21 wherein said fourth antenna is capable of detecting an electromagnetic signal from 0.05 Hz to 5.0 Hz.

23. The system of claim 7 wherein an amplifier and filtering stage of said ground detectors comprises:
 a) a preamp having an output;
 b) an amplifier filter circuit having an output with it's input coupled to said preamp;
 c) 3 low pass filters having an output with it's input coupled to said amplifier filter circuit;
 d) a DC blocking capacitor having an output with it's input coupled to said 3 low pass filters;
 e) an amplifier having an output with it's input coupled to said DC blocking capacitor; and
 f) a variable amplifier having an output with it's input coupled to said amplifier.

24. The system of claim 23 wherein said amplifier filter circuit further comprises: a 1000 microfarad capacitor in series between at least one low pass filter and two stages of amplification.

25. A method of processing earthquake data comprising:
 a) generating an extremely low frequency (ELF) data signal from a satellite in response to an electromagnetic signal emanating from and characterizing an earthquake
 b) downloading said ELF data in a particular region from said satellite;
 c) comparing said ELF data to a threshold value in a database;
 d) checking a database for solar flare activity;
 e) calculating a reverse propagation path of said ELF data;
 f) comparing said ELF data with historical earthquake data in said region;
 g) waiting for said satellite to make another orbit, and reverify said ELF data and;
 h) placing ground monitors in locations around origin of said ELF data to determine a centroid of ELF activity.

26. The method of claim 25 where in said database is accessed through the NOAA website.

27. A method of locating an extremely low frequency (ELF) signal comprising:
 a) generating an ELF data signal from a satellite in response to an electromagnetic signal emanating from and characterizing an earthquake
 b) calculating an estimated centerpoint of said ELF signal based on data received from said satellite;
 c) deploying a ground monitor at said centerpoint;
 d) deploying one or more ground monitors on the fault line near the centerpoint;
 e) determining which ground monitor has the highest root mean squared (rms) data output;
 f) moving all other monitors except that determined in step e) in a cross-track orientation to the fault line to determine if the source is on the main fault trace or a splinter fault in close proximity;
 g) repeat steps e) and f) as necessary to locate the signal to a determined threshold distance.

* * * * *